__United States Patent__ [19]

Felcht et al.

[11] Patent Number: 4,650,863

[45] Date of Patent: Mar. 17, 1987

[54] PREPARATION OF WATER-SOLUBLE MIXED CELLULOSE ETHERS

[75] Inventors: Utz-Hellmuth Felcht, Bad Soden; Gerhard Buchberger, Wiesbaden-Auringen, both of Fed. Rep. of Germany

[73] Assignee: Hoechst Aktiengesellschaft, Fed. Rep. of Germany

[21] Appl. No.: 732,733

[22] Filed: May 10, 1985

[30] Foreign Application Priority Data

May 15, 1984 [DE] Fed. Rep. of Germany ........ 3417952

[51] Int. Cl.$^4$ ............................................ C08B 11/193
[52] U.S. Cl. ........................................ 536/90; 536/84; 536/91
[58] Field of Search .............................. 536/90, 84, 91

[56] References Cited

U.S. PATENT DOCUMENTS

| 3,388,082 | 6/1968 | Rodgers | 260/17 |
| 3,544,556 | 12/1970 | Eichenseer et al. | 536/91 |
| 4,015,067 | 3/1977 | Liu et al. | 536/96 |
| 4,460,766 | 7/1984 | Felcht et al. | 536/84 |
| 4,501,887 | 2/1985 | Kornrumpf et al. | 536/84 |
| 4,550,161 | 10/1985 | Felcht et al. | 536/90 |

FOREIGN PATENT DOCUMENTS

| 1543136 | 7/1969 | Fed. Rep. of Germany . |
| 1568423 | 3/1970 | Fed. Rep. of Germany . |
| 2636935 | 3/1977 | Fed. Rep. of Germany . |
| 734924 | 8/1955 | United Kingdom . |
| 3316124 | 11/1984 | Fed. Rep. of Germany . |
| 909039 | 10/1962 | United Kingdom . |

OTHER PUBLICATIONS

Ullmanns Encyklopädie der technishen Chemie, vol. 4, pp. 193 to 212.

*Primary Examiner*—Ronald W. Griffin
*Attorney, Agent, or Firm*—Berman, Aisenberg & Platt

[57] ABSTRACT

The process for preparing water-soluble mixed cellulose ethers proceeds in the following steps:
(a) alkalization of the cellulose,
(b) etherification of the alkali cellulose in the presence of a base, using at least one etherifying agent which requires, for the reaction with cellulose, a catalytic and sub-stoichiometric quantity of a base, and
(c) after increasing the quantity of base, further etherification of the cellulose ether so prepared, using at least one etherifying agent which requires, for the reaction with cellulose, an at least stoichiometric quantity of a base or a catalytic and sub-stoichiometric quantity of a base, increased over the quantity used in (a), with at least one inert organic solvent being used as a dispersing auxiliary in at least one of the steps and water being present in all steps. The organic solvent used is dimethyl ether, which either is used alone or in a mixture with dimethoxyethane, an alkanol, an alkanediol and/or an alkoxyalkanol. The process serves, in particular, for the preparation of methyl-hydroxyethyl cellulose or methyl-hydroxypropyl cellulose.

13 Claims, No Drawings

PREPARATION OF WATER-SOLUBLE MIXED CELLULOSE ETHERS

RELATED APPLICATION

This application is related to application Ser. No. 605,192, filed on Apr. 27, 1984, now U.S. Pat. No. 4,550,161 issued Oct. 29, 1985 the entire disclosure of which is incorporated herein by reference.

TECHNICAL FIELD

The present invention relates to a three-step process for preparing water-soluble mixed cellulose ethers.

BACKGROUND

The preparation of cellulose ethers having uniform or different types of ether substituents is known [see, for example, "Ullmanns Encyklopaedie der technischem Chemie" (Ullmann's Encyclopedia of Industrial Chemistry), Verlag Chemie—Weinheim, 4th edition, 1975, pages 192 et seq.]. Each preparation is, in general, either by x) the principle of Williamson's ether syntheses [by reacting cellulose with alkyl halides or aralkyl halides (with stoichiometric consumption of a base)] and/or by y) reacting cellulose with activated reactants which are capable of reacting directly with hydroxyl groups (in the presence of catalytic, i.e. sub-stoichiometric, quantities of a base):

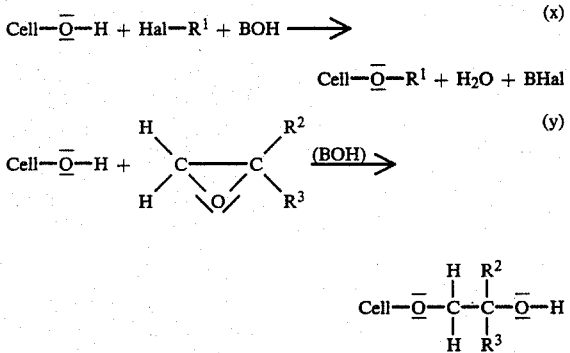

In these general equations:
Cell-O-H denotes a hydroxyl group (on the cellulose molecule) which is to be etherified,
Hal denotes chlorine or bromine,
$R^1$ denotes an alkyl radical (from $C_1$ to $C_{15}$), an aralkyl radical (from $C_7$ to $C_{15}$), a carbonylalkyl radical (from $C_1$ to $C_3$), a sulfonoalkyl radical (from $C_1$ to $C_3$), a phosphonoalkyl radical (from ($C_1$ to $C_3$), a hydroxyalkyl radical (from $C_1$ to $C_6$) or an N,N-dialkylaminoalkyl radical (in which each alkyl group is from $C_1$ to $C_3$),
each of $R^2$ and $R^3$ is, independently, hydrogen or an alkyl radical (from $C_1$ to $C_{13}$), and
BOH denotes a base, such as NaOH, an alkali-metal hydroxide, an alkaline-earth-metal hydroxide or a quaternary ammonium base.

For preparing mixed ethers of cellulose, several etherifying agents are allowed to act simultaneously or stepwise on cellulose. For this purpose, reactions are carried out according to only one of the variants [(x) or (y)] indicated or, preferably, according to both variants. The following are examples of reaction products which are prepared by variant (x): methyl cellulose (MC), benzyl cellulose (BC), carboxymethyl cellulose (CMC), sulfonoethyl cellulose (SEC), phosphonomethyl cellulose (PMC), or N,N-diethylaminoethyl cellulose (DEAEC). The following are examples of reaction products which are prepared by variant (y): hydroxyethyl cellulose (HEC) or hydroxypropyl cellulose (HPC). Mixed ethers of cellulose which are prepared by either one or both of the variant(s) include, for example, methyl hydroxethyl cellulose (MHEC), ethyl hydroxyethyl cellulose (EHEC), hydroxyethyl hydroxypropyl cellulose (HEHPC), methyl carboxymethyl cellulose (MCMC), hydroxyethyl phosphonomethyl cellulose (HEPMC), or methyl hydroxyethyl hydroxypropyl cellulose (MHEHPC). Within the scope of the following statements, the term "cellulose ethers" is understood to mean both products having a unitary substituent, such as hydroxyethyl cellulose, and products having at least two different substituents, such as methyl carboxymethyl cellulose.

The former, not prepublished, German Offenlegungsschrift No. 33 16 124 (filed May 3, 1983) describes a process for preparing water-soluble mixed cellulose ethers in three steps, comprising:
(a) alkalization of cellulose,
(b) etherification of the alkali cellulose in the presence of a base, using at least one etherifying agent which requires, for the reaction with cellulose, a catalytic and sub-stoichiometric quantity of a base, and (after increasing the quantity of base)
(c) further etherification of the cellulose ether so prepared, using at least one etherifying agent which requires, for the reaction with cellulose, an at least stoichiometric quantity of a base or a catalytic and substoichiometric quantity [in excess of the quantity used in (a)] of a base,
with at least one inert solvent selected from the group of dimethoxyethane, an alkanol, an alkane diol and an alkoxy alkanol; the inert solvent being used as a dispersing auxiliary in at least one of the steps and water being present in all steps. Apart from dimethoxyethane, these dispersing auxiliaries include, in particular, alkanols [from $C_1$ to $C_5$ (p.e., isopropanol)], alkane diols [from $C_2$ to $C_3$ (p.e., ethylene glycol)], and alkoxy($C_1$ to $C_4$)alkan($C_2$ or $C_3$)ols (p.e., methoxyethanol). The etherifying agents used are, for example, ethylene oxide in step (b) and methyl chloride or monochloroacetic acid in step (c). For further details and the discussion of the respective state of the art, reference is made to the cited German Offenlegungsschrift.

Processes which differ considerably from the preceding employ dimethyl ether as an organic solvent. Processes of this kind are, for example, disclosed by:

British Patent No. 909,039, which describes a process for the production of MC, MHEC or MHPC, in which dimethyl ether or diethyl ether is employed; the alkali content of the reaction mixture is not changed; no synthesis of a cellulose mixed ether is described in the Examples; the quantity of dimethyl ether used is about 2 to 3 times more than the weight of the cellulose, and the organic solvent is not present during the alkalization step;

German Patent No. 15 43 136 (=U.S. Pat. No. 3,544,556), which describes a process (for the production of MC, MHEC or MHPC) in which dimethyl ether (formed as a byproduct of the etherification) is used; the alkali content of the reaction mixture is not changed; a quantity of about 0.3 to 0.4 part by weight of dimethyl ether is used in the Examples per 1 part by weight of cellulose; and organic solvent is not present in the alkalization step;

German Offenlegungsschrift No. 26 36 935 (=U.S. Pat. No. 4,015,067), which describes the production of various cellulose ethers, and in which excess alkyl chloride, dimethyl ether, hexane, benzene or toluene are said to be used as organic solvents; the alkali content of the reaction mixture is not changed; the only organic solvent used in the Examples is excess alkyl chloride; all reactants are first mixed in a vessel, and the total weight of the etherifying agent plus the organic solvent is about 10 to 20 times higher than the weight of the cellulose, whereby the dimethyl ether portion should not exceed 60% of the total.

SUMMARY OF THE INVENTION

An object of the present invention is to provide a process for preparing water-soluble mixed cellulose ethers, i.e. cellulose ethers having at least two different types of substituents. A further object is to provide a process for preparing products in an economical manner, i.e. particularly at a high selective efficiency in the etherification steps. Another object is to obtain excellent product quality, i.e. uniform etherification and thus good solubility characteristics and the lowest possible, or even no, amount of residue. A particular object of the invention is to find an organic solvent which makes it possible to reduce the energy consumption required for solvent redistillation in the process according to the cited German Offenlegungsschrift No. 33 16 124, without impairing the advantages offered by the process.

The invention is based on a process (for preparing mixed cellulose ethers) which comprises the steps of:

(a) alkalization of cellulose to obtain alkali cellulose, (b) etherification of the alkali cellulose in the presence of a base, using at least one etherifying agent which requires a catalytic and sub-stoichiometric quantity of a base, for the reaction with cellulose, and (after increasing the quantity of base)

(c) further etherification of the cellulose ether so prepared, using at least one etherifying agent which requires (for the reaction with cellulose) an at least stoichiometric quantity of a base or a catalytic and sub-stoichiometric quantity of a base which is increased over the quantity used in step (a), with at least one inert organic solvent being used as a dispersing auxiliary in at least one of the steps and water being present in all steps. The process of the present invention is characterized by using dimethyl ether as the organic solvent, either alone or in a mixture with dimethoxyethane, an alkanol, an alkanediol and/or an alkoxyalkanol.

DETAILS

The use of dimethyl ether and of dimethoxyethane is known per se from literature. The alkanols, alkanediols, and alkoxyalkanols include, in particular, alkanols from $C_1$ to $C_5$, alkanediols of $C_2$ or $C_3$ (or oligomeric or polymeric individuals which have units comprising these alkanediols), and alkoxy($C_1$ to $C_4$)alkan($C_2$ or $C_3$)ols; methanol, ethanol, isopropanol, tert.-butanol and ethylene glycol [ethanediol(1,2)] are preferred. In the alkalization and/or etherification mixture(s), the dimethyl ether is preferably present alone, but it is also possible to use it in a mixture with one or several of the other mentioned solvents. Depending on the etherifying agent(s), i.e. depending on the type(s) of ether substituent(s) to be obtained, and provided that mixtures are employed—it is fundamentally possible to use any mixing ratios between the solvents; preferably, however, not more than 50% by weight, particulary from 0.1 to 30% by weight, of dimethoxyethane, alkanols, alkanediols and/or alkoxyalkanols are added to the dimethyl ether.

Of the etherifying agents which are suitable for use in the process variants, ethylene oxide, propylene oxide, methyl chloride, and/or monochloroacetic acid or one of the salts or hydrolyzable derivatives thereof is preferred. The process of the invention may, for example, be conducted with dimethyl ether and optionally a further organic solvent being present in both etherification steps (b) and (c) and optionally also in the alkalization step (a); it is, however, preferred to conduct the process in such a way that the organic solvent is present in the etherification step (b) and optionally also in the alkalization step (a) and is, together with other components which have boiling points below the boiling point of water, removed from the mixture by distillation before the beginning of etherification step (c). This last-mentioned variant is especially used in those cases, in which ethylene oxide or propylene oxide is used as the etherifying agent in the first etherification step [step (b)] and methyl chloride is used in the second etherification step [(step (c)] and in which the organic solvent comprises dimethyl ether, dimethoxyethane and/or isopropanol and, optionally, methanol. It is thus particularly possible to employ a high excess of alkylene oxide in the first etherification step, for example, in order to achieve reaction times which are as short as possible or to effect a more uniform distribution of substitution over the molecular chains of the cellulose ethers. This excess can then be decreased by simple distillation or evaporation before the second etherification step is carried out and can be reused in the process without any further purification (recycling). All process variants should yield water-soluble products, i.e. the produts have DS and/or MS values which effect solubility in water; this means, in particular, that the products are water-soluble to the extent of at least 90%, particularly at least 97%.

The process of the present invention is conducted discontinuously or continuously, using one or several of the autoclave apparatuses known from cellulose ether chemistry (for example, kneaders, agitator vessels or impeller mixers). Since, on the one hand, the temperature of the reaction mixture in general is higher than the boiling temperature of the organic solvent/water mixture, and, on the other hand, the boiling point of dimethyl ether is clearly below room temperature, the process of this invention is effected in a pressure apparatus; it is also customary to carry out reactions in a pressure apparatus when reactants are used which are already in a gaseous state under normal conditions, i.e., standard pressure and room temperature, (for example, when ethylene oxide is used as the etherifying agent), so that the use of pressure apparatuses in this field of application is known and customary. The suggested quantities of components reflect only the sum of the quantities of the components required for the reaction at the beginning of the respective etherifying steps; for the separate alkalization step, part of the cellulose and the alkali-metal hydroxide is, at that time, already in the form of alkali cellulose, or when, for example, the etherifying agent is introduced into the reaction mixture in the acid form (e.g. monochloroacetic acid for the preparation of CMC), additional base must be used for neutralization.

The cellulose employed is either of natural origin, for example, cotton linters or wood pulp, or is in a regenerated form, such as cellulose hydrate; the particle size of the cellulose before the beginning of the reaction is, insofar as possible, less than about 2.5 mm, in particular less than about 1 mm. This particle size is achieved, for example, by grinding cellulose (which is supplied in a longer-fibered form) into "powder".

The base is preferably an alkali-metal hydroxide usually NaOH, but also KOH or LiOH—in solid form or in a dissolved form as an aqueous alkali-metal-hydroxide solution (for example, in the form of a 10 to 50% strength by weight solution). Alternatively, an ammonium base is used. In the process of the invention it is preferred to employ from about 0.5 to 30 parts by weight, in particular from about 1 to 18 parts by weight, of organic solvent per 1 part by weight of cellulose. When the base comprises alkali-metal-hydroxide, it is generally present (in any particular step) in a quantity of from 0.5 to 12.0 moles, in particular from 0.8 to 6.0 moles, per 1 mole of cellulose (calculated on the basis of an anhydro-D-glucose unit); this quantity is, however, dependent on etherification variant (x) or (y), as indicated in the preceding discussion and in the examples. In steps (a) and (b), the quantity of alkali-metal hydroxide is preferably from about 0.5 to 1.5 moles, while it is preferably from about 2.0 to 6.0 moles in step (c) [at least in the preparation of MHEC or MHPC]. The quantity of water in the reaction mixture is advantageously within the range from 5 to 25 moles per 1 mole of cellulose; or, when the mixture of liquids (organic solvent/water) serves as a reference quantity, the quantity of water in the mixture is 3 to 40% by weight. Preferred etherifying agents are, alkyl chlorides (from $C_1$ to $C_3$), alkylene oxides (from $C_2$ to $C_4$) and/or chloroalkanoic acids (from $C_2$ to $C_4$) or the salts or hydrolyzable esters thereof, in particular, methyl chloride, ethyl chloride, ethylene oxide, propylene oxide and/or monochloroacetic acid or a corresponding salt or ester. The etherification reactions are optionally carried out with butylene oxide-1,2, monochloropropionic acid, chloroethanesulfonic acid, vinylsulfonic acid, acrylonitrile, chloromethanephosphonic acid, 1-N,N-diethylamino-2-chloroethane or 2,3-epoxypropyl-trimethyl-ammonium chloride. The quantity of etherifying agent is, in each case, from 0.05 to 30 moles, particularly from 0.1 to 10 moles, per 1 mole of cellulose. In the particularly preferred process for preparing MHEC or MHPC, the molar quantity of etherifying agent is from 0.05 to 2.0 moles in step (b) and from 1.0 to 30 moles in step (c).

In the practice of the process according to the present invention, it is preferred to alkalize the cellulose in a mixture comprising organic solvent, water and alkali-metal hydroxide (or quaternary ammonium base), whereafter the etherifying agent is added in the two prescribed steps (depending on the type of etherifying agents used). Alkalization is optionally carried out in the absence of organic solvent, which is added in at least one of the etherification steps. As is known, the reaction mixtures and reaction vessels, which are employed in each case, are optionally flushed with inert gas, for example nitrogen, in order to remove oxygen and thus to achieve high viscosities of the reaction products; alternatively, so-called antioxidants, such as pyrogallol or gallic acid, are added to one or both etherification reaction mixtures in order to prevent a reduction in viscosity(depolymerization).

All steps are, as a rule, operated while stirring well. The separate alkalization step is usually effected at room temperature (from 0° C. to 30° C., in particular from 15° C. to 30° C.), while etherification takes place particularly successfully at temperatures between 30° C. and 120° C., in particular at temperatures of up to 110° C. The first etherification step is generally conducted at a lower temperature; thereafter the quantity of base is increased and the second etherification step is run at a higher temperature. The maximum pressure set up in the reaction vessel corresponds to the sum of the partial pressures of the components in the reaction mixture.

The time required for each etherification step is ordinarily from 20 minutes to 8 hours, depending on the reaction temperature. The crude etherification product is first freed from solvent and other liquid components by distillation, preferably after adding acid until the unconsumed base is neutralized, and it is then, if desired, subjected to extraction in order to remove adhering salts. Finally, it is dried and, if desired, ground, mixed with further components or granulated. These methods of working-up, purification and post-treatment are those which are customary in the chemistry of cellulose ethers and therefore do not require a detailed description.

In addition to the advantages which have already been mentioned, the process of the present invention has the following particular advantages: The quantity of base used in the first etherification step, which principally has only a catalytic function therein, is completely available for consumption in the second etherification step; this applies, in particular, also to the process variant in which the organic solvent and optionally an excess of etherifying agent are, for the most part, removed by evaporation after the first and before the beginning of the second etherification step, since the base, in particular an alkalimetal hydroxide, is not removed in the process. Due to the fact that the process steps can basically be conducted independently, the quantitative ratios and process parameters (which result in an optimum quality product and a cost-saving and ecologically-acceptable procedure) can successfully be set up for each step. The imperative use of dimethyl ether leads to an improvement in the interaction between the components and thus to improved efficiency of the employed etherifying agents.

The cellulose ethers which are prepared by the process according to the invention are useful in known fields of technology, for example, as thickeners, adhesives, additives in the field of building materials, additives in the field of foodstuffs, or the like.

In the examples which follow, parts by weight are related to parts by volume as kg to $dm^3$; percentages relate to weight. The "DS" is the degree of substitution, i.e., the average number of substituted OH groups per anhydro-D-glucose unit; in the case of cellulose it is within the range from 0.0 to 3.0. The "MS" is the molar degree of substitution, i.e. the average number of moles of the substituting reagent which have been attached by an ether linkage per mole of anhydro-D-glucose unit; in the case of cellulose it can even be greater than 3.0; it is normally used instead of the DS in order to characterize those substituents on the cellulose ether molecule which can be formed by multiple substitution at an OH group, i.e., for example, in the case of the hydroxyalkyl substituent, because the resulting OH groups of the hydroxyalkyl groups can also be substituted—like the OH groups of the cellulose itself.

EXAMPLE 1

After purging a pressure-tight mixer with nitrogen, 3 parts by weight of ground, air-dried pine pulp are mixed therein with 3 parts by weight of dimethyl ether per 1 part by weight of cellulose. Then 2.48 parts by weight of a 28% strength aqueous NaOH solution are added in vacuo, and the mixture is stirred for 30 minutes at room temperature. Then 0.19 part by weight of ethylene oxide is added, and the resulting dispersion is heated to 70° C. while stirring and is maintained at this temperature for 30 minutes. Thereafter, the reaction mixture is distilled to obtain substantially complete removal of the dimethyl ether and, optionally, also of the excess of ethylene oxide. In the process, the distillate is collected in a cooled receiver for re-use, either in a new batch or in a continuous procedure. The alkaline reaction product is then intensely mixed with 2.3 parts by weight (i.e., 0.77 part by weight per 1 part by weight of cellulose), of fresh dimethyl ether and 5.64 parts by weight of a 49.5% strength technical-grade aqueous NaOH solution at a temperature of from 20° C. to 40° C. and alkalized for 30 minutes at the same temperature. In the mixer, 4.4 parts by weight of methyl chloride are added, and the mixture is methylated for 1.5 hours at a reaction temperature of 85° C. Upon separation of the volatile constituents, the resulting MHEC is washed salt-free with hot water and is dried. The product obtained forms a clear solution and has a $DS_M$ of 1.99 and a $MS_{HE}$ of 0.18.

EXAMPLE 2

The process employed is the same as for Example 1, but 2.03 parts by weight of a 27.5% strength aqueous NaOH solution are used for alkalization, and alkalization is effected at room temperature for 45 minutes. Thereafter, 0.51 part by weight of propylene oxide is added, and the mixture is heated to 80° C. and treated at this temperature for one hour. Then the dimethyl ether is distilled off, whereby unreacted propylene oxide portions are also removed. The distillate, which contains about 20% of the propylene oxide employed, is optionally re-used in another reaction. The hydroxypropyl cellulose so prepared is mixed with 3.2 parts by weight of dimethyl ether. 4.51 parts by weight of a 49.5% strength technical-grade aqueous NaOH solution are added, and alkalization is performed at from 20° C. to 40° C. for 30 minutes. Following the addition of 3.52 parts by weight of methyl chloride, the resulting mixture is slowly heated to 85° C. and maintained at this temperature for 1.5 hours. The volatile constituents of the mixture are then distilled off. The obtained MHPC is washed free of salt with hot water. The resulting product forms a clear solution; it has a DSM of 1.82 and a $MS_{HP}$ of 0.20.

EXAMPLE 3

The process employed is the same as for Example 1, but 2.72 parts by weight of a 28.2% strength aqueous NaOH solution are used for alkalization, and alkalization is effected for 15 minutes at room temperature. Then 0.92 part by weight of ethylene oxide is added. The mixture is heated to 30° C. and kept at this temperature for 30 minutes. Thereafter, it is heated to 70° C., and mixing is continued at this temperature for another 60 minutes. The dimethyl ether is distilled off and is available for re-use in another reaction. The obtained hydroxyethyl cellulose is alkalized at from 20° C. to 40° C. for 30 minutes, following the addition of 0.72 part by weight of a 49.5% strength, technical-grade, aqueous NaOH solution. 9 parts by weight of isopropanol (85% strength aqueous solution) are added, and 4.65 parts by weight of an aqueous solution prepared from 1.32 parts by weight of monochloroacetic acid, 0.33 part by weight of water and 3 parts by weight of isopropanol (85% strength azeotrope) are metered in within 15 minutes. The mixture is heated to 70° C. within 30 minutes, distillation in vacuo of the isopropanol is then started. The reaction is completed during the distillation. After the distillation process a neutral, finely-particulate product is obtained. The carboxymethyl-hydroxyethyl cellulose prepared in this way is used with advantage, as an unpurified product, as an additive in oil drilling. It has a $DS_{CM}$ of 0.70 and a $MS_{HE}$ of 0.80.

The invention and its advantages are readily understood from the foregoing description. It is apparent that various changes can be made in the process without departing from the spirit and scope of the invention or sacrificing its material advantages. The process as herein presented, is merely illustrative of preferred embodiments of the invention.

What is claimed is:

1. A process for preparing a water-soluble mixed cellulose ether, comprising the following steps:
   (a) alkalization of cellulose to obtain alkali cellulose,
   (b) etherification of the alkali cellulose in the presence of a base to obtain cellulose ether, using at least one etherifying agent which, for reaction with cellulose, requires a catalytic and sub-stoichiometric quantity of a base, and
   (c) after increasing the quantity of base, further etherification of the cellulose ether so prepared, using at least one etherifying agent which, for reaction with cellulose, requires an at least stoichiometric quantity of a base or a catalytic and sub-stoichiometric quantity of a base, which is increased over the quantity used in step (a), wherein each step is effected in a reaction medium comprising water, and the reaction medium for at least one of the steps comprises at least one inert organic solvent as a dispersing auxiliary, the organic solvent being dimethyl ether alone or dimethyl ether in admixture with dimethoxyethane, an alkanol, an alkanediol and/or an alkoxyalkanol.

2. A process as claimed in claim 1, wherein the etherifying agent which requires a catalytic and sub-stoichiometric quantity of a base is a compound of the general formula

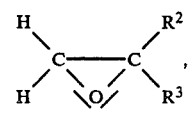

in which each of $R^2$ and $R^3$ independently denotes hydrogen or an alkyl radical (from $C_1$ to $C_{13}$).

3. A process as claimed in claim 1, wherein the etherifying agent which requires an at least stoichiometric quantity of a base is a compound of the general formula

in which $R^1$ denotes an alkyl radical (from $C_1$ to $C_{15}$), an aralkyl radical (from $C_7$ to $C_{15}$), a carboxyalkyl radical (from $C_1$ to $C_3$), a sulfonoalkyl radical (from $C_1$ to $C_3$), a phosphonoalkyl radical (from $C_1$ to $C_3$), a hydroxyalkyl radical (from $C_1$ to $C_6$) or an N,N-dialkylaminoalkyl radical in which each alkyl group is from $C_1$ to $C_3$; and Hal denotes chlorine or bromine.

4. A process as claimed in claim 2, wherein the etherifying agent which requires an at least stoichiometric quantity of a base is a compound of the general formula

in which $R^1$ denotes an alkyl radical (from $C_1$ to $C_{15}$), an aralkyl radical (from $C_7$ to $C_{15}$), a carboxyalkyl radical (from $C_1$ to $C_3$), a sulfonoalkyl radical (from $C_1$ to $C_3$), a phosphonoalkyl radical (from $C_1$ to $C_3$), a hydroxyalkyl radical (from $C_1$ to $C_6$) or an N,N-dialkylaminoalkyl radical in which each alkyl group is from $C_1$ to $C_3$; and Hal denotes chlorine or bromine.

5. A process as claimed in claim 1, wherein an alkanol (from $C_1$ to $C_5$), an alkanediol (from $C_2$ to $C_3$) and/or an alkoxy($C_1$ to $C_4$)alkan($C_2$ or $C_3$)ol is used apart from dimethyl ether.

6. A process as claimed in claim 2, wherein an alkanol (from $C_1$ to $C_5$), an alkanediol (from $C_2$ to $C_3$) and/or an alkoxy($C_1$ to $C_4$)alkan($C_2$ or $C_3$)ol is used apart from dimethyl ether.

7. A process as claimed in claim 3, wherein an alkanol (from $C_1$ to $C_5$), an alkanediol (from $C_2$ to $C_3$) and/or an alkoxy($C_1$ to $C_4$)alkan($C_2$ or $C_3$)ol is used apart from dimethyl ether.

8. A process as claimed in claim 4, wherein an alkanol (from $C_1$ to $C_5$), an alkanediol (from $C_2$ to $C_3$) and/or an alkoxy($C_1$ to $C_4$)alkan($C_2$ or $C_3$)ol is used apart from dimethyl ether.

9. A process as claimed in claim 2, wherein the etherifying agent comprises ethylene oxide and/or propylene oxide.

10. A process as claimed in claim 3, wherein the etherifying agent comprises methyl chloride or monochloroacetic acid or one of its salts or hydrolyzable derivatives.

11. A process as claimed in any of claims 1 to 10, wherein the dimethyl ether is present in both etherification steps (b) and (c) and optionally also in the alkalization step (a).

12. A process as claimed in any of claims 1 to 10, wherein the dimethyl ether is present in etherification step (b) and optionally also in the alkalization step (a) and is, together with the other components which have boiling points below the boiling point of water, removed from the reaction medium by distillation before the beginning of etherification step (c).

13. A method of improving the quality of a mixed cellulose ether prepared by the following steps:
 (a) alkalization of cellulose to obtain alkali cellulose,
 (b) etherification of the alkali cellulose in the presence of a base to obtain cellulose ether, using at least one etherifying agent which, for reaction with cellulose, requires a catalytic and sub-stoichiometric quantity of a base, and
 (c) after increasing the quantity of base, further etherification of the cellulose ether so prepared, using at least one etherifying agent which, for reaction with cellulose, requires an at least stoichiometric quantity of a base or a catalytic and sub-stoichiometric quantity of a base, which is increased over the quantity used in step (a)
wherein each step is effected in a water-containing reaction mixture,
which method comprises incorporating sufficient dimethyl ether in the reaction medium for at least one step to serve as a dispersing auxiliary.

* * * * *